United States Patent [19]
Nolte

[11] Patent Number: 5,097,756
[45] Date of Patent: Mar. 24, 1992

[54] DEVICE FOR REMOVING FATS FROM COOKED FOODS

[76] Inventor: Ray J. Nolte, 2403 Telegraph Rd., St. Louis, Mo. 63125

[21] Appl. No.: 463,334

[22] Filed: Jan. 10, 1990

[51] Int. Cl.⁵ .......................... A47J 27/00; A47F 1/04
[52] U.S. Cl. ........................................ 99/495; 99/456;
99/485; 99/646 R; 206/499; 210/502.1;
210/513; 221/63; 221/310
[58] Field of Search ................ 99/485, 495, 496, 425,
99/446, 450.1, 646, 646 R, 646 C; 426/107, 113;
206/499, 204, 407; 383/109; 428/35.7, 286, 163,
398; 221/36, 56, 63, 303, 307, 310, 312 R, 312
C, 279; 210/502.1, 513

[56] References Cited
U.S. PATENT DOCUMENTS

| 910,153 | 1/1909 | Smith | 221/56 |
|---|---|---|---|
| 1,201,963 | 10/1916 | Hill | 221/310 |
| 1,513,792 | 11/1924 | Arelt | 221/56 |
| 2,431,121 | 11/1947 | Hunter | 221/307 |
| 2,813,289 | 11/1957 | Even | 221/312 R |
| 3,112,046 | 11/1963 | Szekely | 221/312 R |
| 3,223,096 | 12/1965 | Goldberg et al. | 206/499 X |
| 3,392,878 | 7/1968 | Jackson | 221/279 |
| 3,498,798 | 3/1970 | Baur et al. | 206/499 |
| 3,580,472 | 5/1971 | Stawski | 206/499 |
| 3,581,934 | 6/1971 | Sciascia | 221/310 |
| 3,613,554 | 10/1971 | Koger | 99/446 |
| 3,613,949 | 10/1971 | Tripodi | 221/310 |
| 3,669,307 | 6/1972 | Pfund et al. | 221/63 |
| 3,706,394 | 12/1972 | Merz | 206/499 |
| 3,976,219 | 8/1976 | Pagnoni | 221/310 |
| 4,865,855 | 9/1989 | Hansen et al. | 426/124 |

FOREIGN PATENT DOCUMENTS 575151 4/1976 Switzerland .......... 221/310

Primary Examiner—Timothy F. Simone

[57] ABSTRACT

A quantity of disposable super absorbent pads of uniform size, stacked one upon the other, and packaged in a disposable tube. The purpose of the pads being the removal of fats from home cooked foods, through absorption into the bottom pad, thereby lowering the cholesterol content of the food. Means are provided to eject the soiled bottom pad.

7 Claims, 3 Drawing Sheets

DEVICE FOR REMOVING FATS FROM COOKED FOODS

BACKGROUND

1. Field of the Invention

This invention relates to the packaging of uniformly shaped super absorbent disposable pads whose purpose is the removal by absorption of liquified fat and grease normally found floating on hot soups and gravies.

Medical research in the past decade has shown that saturated fats, such as those found floating on hot soups and gravies, are high in cholesterol which tends to build-up in the arteries of the human body, especically those arteries near the heart.

It is the purpose of this invention to provide a convenient means of removing a substantial amount of saturated fat from the cooked foods.

2. Description of Prior Art

No prior art concerning itself with the removal of floating fats or grease from soups, gravies, or other foods has been identified.

SUMMARY OF THE INVENTION

It is the object of this invention to provide a quantity of disposable absorbent pads, of uniform size, packaged in a container which will permit the use and disposal of one pad at a time. The bottom pad, after being used in removal of liquified fats from cooked foods, can be manually ejected.

Figure 1:
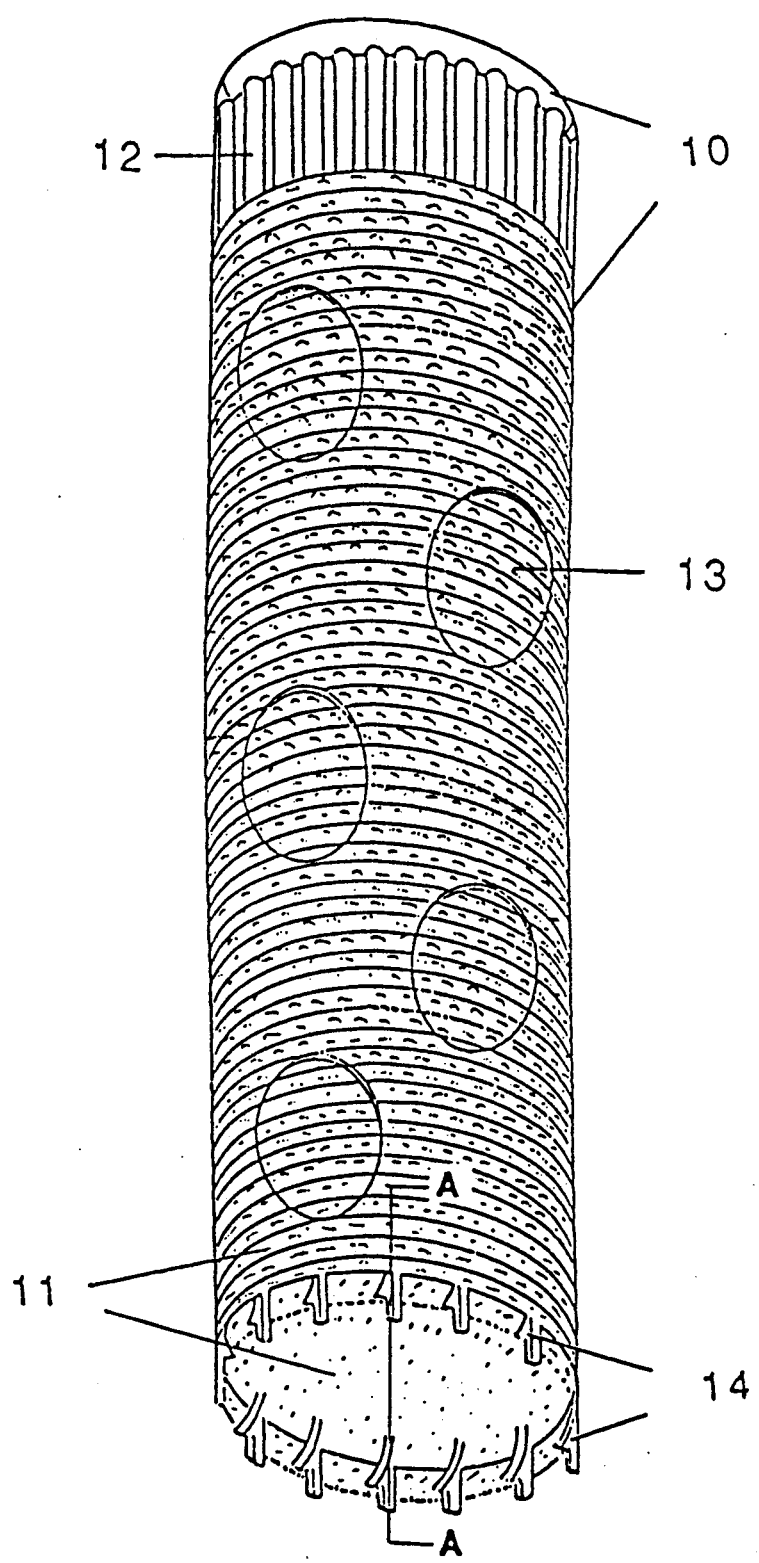
FIG. 1 is a perspective view of a full tube of absorbent disposable pads.

DESCRIPTION OF THE PREFERRED EMBODIMENT:

FIG. 1, a visual view, illustrates tube 10, the packaging for a stack of uniformly shaped super absorbent pads 11. Said pad is approximately 50 millimeters in depth and has a diameter sufficiently less than the interior diameter of the tube to insure easy movement of the pads through the tube, but of sufficient diameter that its movement can be controlled by holding fingers 14. Each super absorbent pad has a coating, or layer, of liquid resistant material on its top surface to prevent the liquid fat from saturating more than one pad at a time. The bottom pad is held by approximately 12 holding fingers 14. Said fingers hold the bottom pad firmly and provide a very substantial area on the bottom and sides of the bottom pad for absorbing floating fat from the cooked food.

When the bottom pad becomes saturated with fat, slight pressure exerted on the top of ribbed pressure pad 12 ejects the bottom pad.

Figure 2:
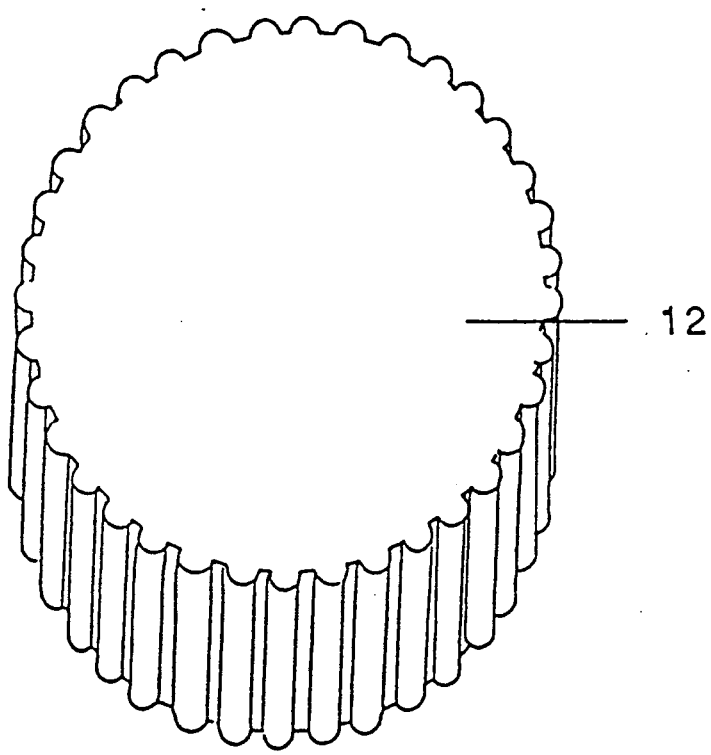
FIG. 2 is a view of the ribbed pressure pad.

FIG. 2 is a perspective view of the ribbed pressure pad. The ribbed pressure pad is approximately 200 millimeters in depth and the over-all planar diameter is equal to that of the disposable pads.

Figure 3:
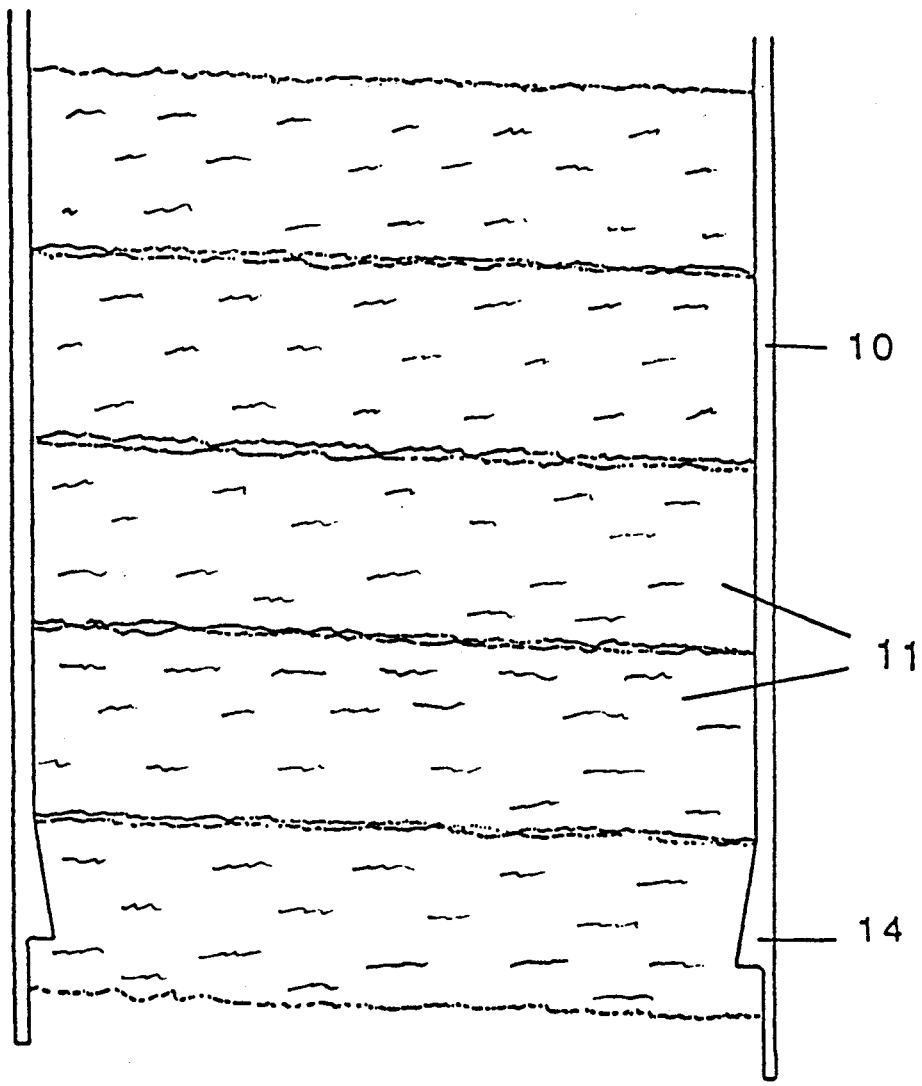
FIG. 3 is a cross-sectional planar view taken on line A—A of FIG. 1 showing the function of the holding fingers.

FIG. 3 is a cross-sectional planar view of the lower part of the tube taken on line A—A of FIG. 1. It clearly shows how the bottom pad is firmly held by the holding fingers. The lower half of the holding fingers are away from the pad so that as pressure is exerted to eject the bottom pad, once the top of the used bottom pad passes the midpoint of the holding fingers, the holding fingers consentrate on the pad taking its position and the bottom pad is free to fall. The diameter of the inner circle formed by the lower tips of the holding fingers is greater than the inner diameter of the tube or the diameter of the absorbent pad itself.

As pads are diminished through use and the pressure pad is located lower in the tube, eject pressure can still be exerted on the top of the pressure pad by placing a finger or thumb through the appropriate oval shaped opening 13. Said oval shaped openings are spaced at intervals throughout the length of the tube.

I claim:

1. Apparatus for removing fats from cooked foods comprising a container member having top and bottom end portions and a passageway extending therethrough, said passageway being sized and shaped for receiving a plurality of absorbent pads in stacked relationship when positioned therewithin, a plurality of holding fingers extending downwardly from the bottom end portion of said container member and being circumferentially spaced therearound, each of said holding fingers having a (distal end) lower tip portion spaced from the bottom end portion of said container member and a pad holding portion located intermediate the respective opposite ends thereof, each of said intermediate pad holdings portions having at least a portion thereof extending laterally inwardly towards the center of said passageway for engaging and holding an absorbent pad located adjacent the bottom end portion of said container member such that when said absorbent pad is engaged with said pad holding portions a portion thereof protrudes outwardly from the bottom end portion of said container member, the (distal end) lower tip portions of said holding fingers being shaped and dimensioned such that the cross-sectional planar area defined by and between said plurality of (distal end) lower tip portions is greater than the cross-sectional planar area of said absorbent pads whereby when said pads are disengaged from said holding portions they will fall free of said holding fingers for disposal thereof and ejection means to enable urging of said stack of absorbent pads located within said passageway towards the bottom end portion of said container member so as to disengage the lowermost pad from the pad holding portions of said holding fingers.

2. The apparatus of claim 1 wherein said pad holding portions are shaped and dimensioned so as to enable an absorbent pad engaged therewith to be manually moved towards the (distal end) lower tip portions of said holding fingers but which restricts movement of said pad in the opposite direction.

3. The apparatus of claim 1 wherein said ejection means includes a pressure pad positionable in the passageway adjacent the top end portion of said container member so as to rest upon the uppermost pad positioned therewithin, said pressure pad being slidably movable within said passgeway by applying pressure thereto so as to urge the stack of pads within said passageway towards the bottom end portion of said container member, movement of said pressure pad towards the bottom end portion of said container member causing the lowermost pad within said passageway to disengaged from said holding fingers and eject from said container member.

4. The apparatus of claim 1 wherein said container member includes a plurality of openings spaced about the outer periphery thereof and communicating with the passageway extending therethrough, said plurality of openings enabling a user to make contact with and to manually urge said pressure pad between the bottom end portion of said container member.

5. The apparatus of claim 1 wherein each of said absorbent pads includes a layer of moisture-resistant material on its upper surface capable of preventing transfusion of liquids absorbed by it to the pad above it.

6. Apparatus for holding a plurality of disposable absorbent pads in stacked relation one above the other with a lowermost pad partially exposed so as to be positionable to contact the surface of a fat containing liquid for absorbing the fat therefrom, said apparatus comprising a body member having top and bottom end portions and an endless side wall extending therebetween, a cavity positioned and located between the respective top and bottom end portions of said body member for receiving and holding a plurality of absorbent pads positioned therewithin, said body member being opened at least its bottom end portion to provide access to said cavity, a plurality of holding fingers located in spaced relationship around the periphery of the bottom end portion of said body member, said holding fingers having detent means extending inwardly toward said cavity for engaging and holding an absorbent pad located adjacent thereto such that a portion of said pad extends outwardly from the bottom end portion of said body member, each of said holding fingers having a terminal end portion spacedly related from said detent means, the terminal end portion of said holding fingers being shaped and dimensioned so as to enable an absorbent pad to freely pass therebetween once said pad is disengaged from said detent means, a pressure pad positionable within said cavity so as to engage the uppermost absorbent pad positioned therewithin, said pressure pad being movable within said cavity by applying pressure thereto so as to urge said plurality of absorbent pads towards the bottom end portion of said body member, and at least one aperture located on the outer periphery of said body member and extending therethrough so as to communicate with said cavity through which a user can apply manual pressure against said pressure pad to move said plurality of absorbent pads towards the open bottom end portion of said body member, movement of said pressure pad towards the bottom end portion of said body member enabling the lowermost absorbent pad to be disengaged from said detent means and enabling the next adjacent pad to be moved into engagement with said detent means.

7. A container holding uniformly shaped super absorbent pads, used one at a time for absorbing fats from cooked foods, said container comprising:

top and bottom end portions and a passageway therebetween, with a plurality of fingers located adjacent of and extending downward from the bottom end portion of said container;

said plurality of fingers including pad holding means for holding the lowermost super absorbent pad between said plurality of fingers;

said pad holding means restricting the area of said passageway adjacent to the bottom end portion of said container such that the planar opening defined by and between said pad holding means it smaller than the cross sectional area of said passageway;

a plurality of super absorbent pads of uniform shape, stacked one above the other, each having a layer of moisture-resistant material on its upper surface capable of preventing transfusion of liquids absorbed by it to the pad above it;

said stack of super absorbent pads being sized and shaped for insertion into said passageway through the top of said container and being thereafter held within said passageway with the pad holding means on said plurality of fingers;

and a pressure pad for applying pressure to at least one of said super absorbent pads so as to move the lowermost super absorbent pad, engaged with said pad holding means, out of engagement therewith for ejection from said fingers.

* * * * *